(12) United States Patent
Kosak

(10) Patent No.: US 8,585,312 B1
(45) Date of Patent: Nov. 19, 2013

(54) THREE DIMENSIONAL POLYHEDRON FRAME STRUCTURE

(75) Inventor: Marjan Kosak, Ljubljana (SI)

(73) Assignee: Kid Knowledge, Inc., Armonk, NY (US)

( * ) Notice: Subject to any disclaimer, the term of this patent is extended or adjusted under 35 U.S.C. 154(b) by 0 days.

(21) Appl. No.: 12/816,483

(22) Filed: Jun. 16, 2010

(51) Int. Cl.
*F16D 1/00* (2006.01)

(52) U.S. Cl.
USPC .......................................... 403/171; 403/176

(58) Field of Classification Search
USPC .............. 403/170, 171, 176; 434/72, 74, 278, 434/276, 300, 301, 302; 362/576; 248/292.14
See application file for complete search history.

(56) References Cited

U.S. PATENT DOCUMENTS

| | | | |
|---|---|---|---|
| 1,085,460 A | 1/1914 | Michaelis | |
| 1,182,636 A | 5/1916 | Burns | |
| 1,446,868 A | 2/1923 | Baker | |
| 2,546,979 A * | 4/1951 | Cozzone | 403/173 |
| 2,609,638 A | 9/1952 | Lindenmayer | |
| 2,913,834 A * | 11/1959 | Keefe | 434/302 |
| 3,907,334 A | 9/1975 | Schera | 285/20 |
| 4,129,975 A * | 12/1978 | Gabriel | 52/655.2 |
| 4,664,550 A * | 5/1987 | Jachmann et al. | 403/171 |
| 4,789,264 A * | 12/1988 | Galan Inchaurbe | 403/8 |
| 4,822,199 A * | 4/1989 | Nehls | 403/171 |
| 4,872,779 A * | 10/1989 | Imai | 403/171 |
| 4,912,889 A * | 4/1990 | Palumbo | 52/28 |
| 4,915,533 A * | 4/1990 | de la Haye | 403/171 |
| 4,932,686 A | 6/1990 | Anderson | 285/24 |
| 5,051,019 A * | 9/1991 | Kohl | 403/171 |
| 5,054,950 A * | 10/1991 | Zillgen et al. | 403/171 |
| 5,116,193 A * | 5/1992 | Takizawa et al. | 403/27 |
| 5,120,083 A | 6/1992 | Stine | 285/31 |
| 5,184,920 A * | 2/1993 | Strassle | 403/171 |
| 5,251,994 A * | 10/1993 | Strassle | 403/171 |
| 5,487,691 A * | 1/1996 | Chiu | 446/126 |
| 5,498,093 A * | 3/1996 | Imai | 403/171 |
| 5,498,094 A * | 3/1996 | Imai | 403/171 |
| 5,743,670 A * | 4/1998 | Ader | 403/296 |
| 6,106,186 A * | 8/2000 | Taipale et al. | 403/322.4 |
| 6,341,566 B1 * | 1/2002 | Hwang | 108/180 |
| 7,097,146 B2 * | 8/2006 | Tsai | 248/679 |
| 7,322,873 B2 * | 1/2008 | Rosen et al. | 446/91 |
| 2006/0228169 A1 * | 10/2006 | Chang | 403/171 |

FOREIGN PATENT DOCUMENTS

GB          2217897 A   *   11/1989

\* cited by examiner

*Primary Examiner* — Joshua Kennedy
(74) *Attorney, Agent, or Firm* — Leason Ellis LLP

(57) ABSTRACT

A three dimensional polyhedron frame structure formed by a plurality of rigid rods and a plurality of hubs in which each rod has a retractable bolt at at least one end for assembly into a socket of a hub having a plurality of sockets that accept a plurality of rods with the rods being assembled to the hubs in different directions to form frames of various polyhedron shapes. A board is attached to at least one horizontal rod forming a vertical face of a prism frame so that its angle of inclination can be adjusted to demonstrate a principle of gravity. Preferably the rods are electrically conductive and the hubs are non-conductive so that wires can be connected to selected rods to form an electrical circuit.

17 Claims, 4 Drawing Sheets

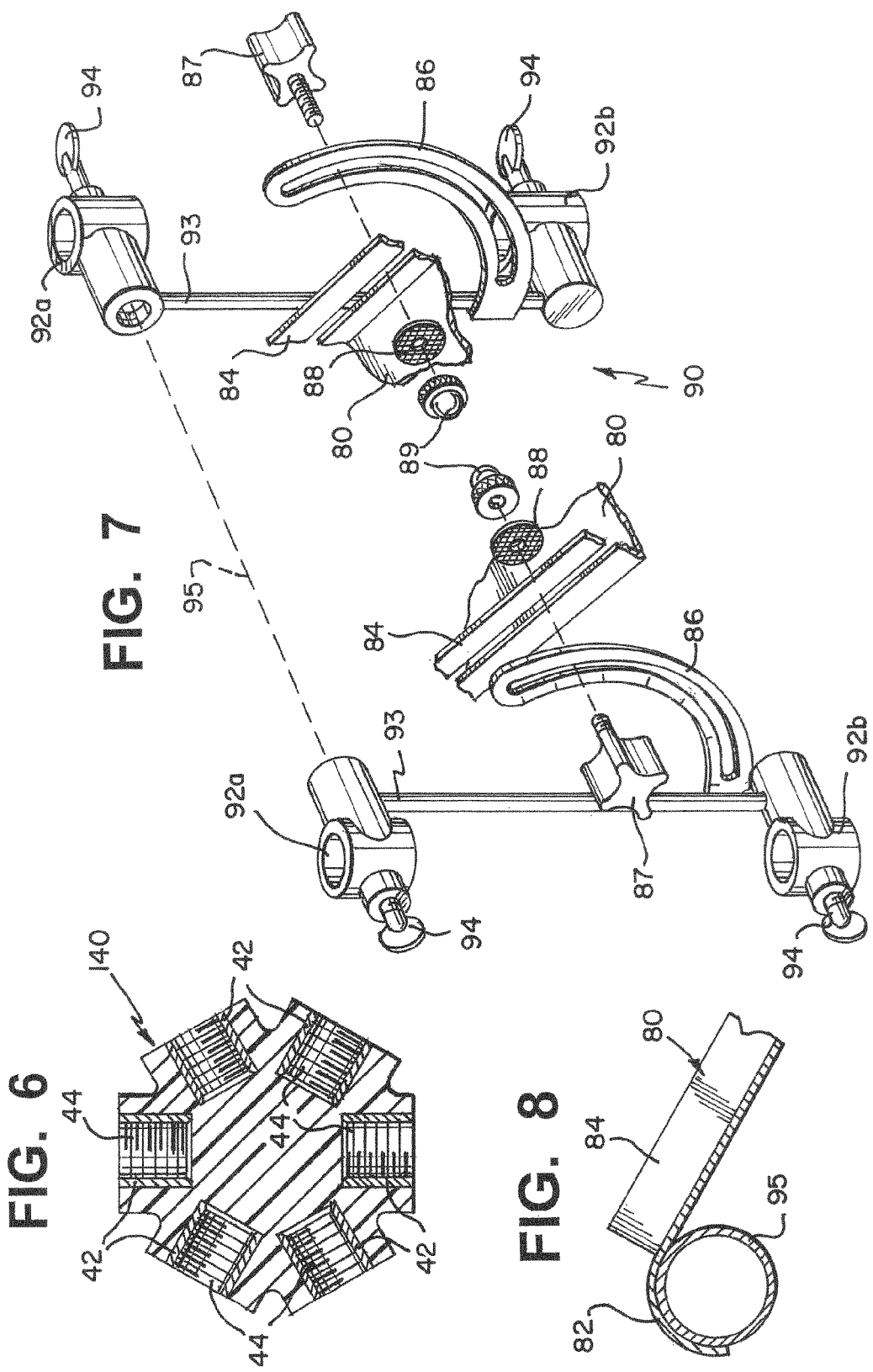

THREE DIMENSIONAL POLYHEDRON FRAME STRUCTURE

FIELD OF THE INVENTION

The present invention relates to a three dimensional polyhedron frame structure formed by a plurality of rigid rods and a plurality of hubs in which at least one end of each rod has a retractable bolt for threaded assembly into or out of a socket of a hub having a plurality of sockets that accepts a plurality of rods with the rods and hubs assembled to form frames of various polyhedron shapes.

BACKGROUND OF THE INVENTION

It is often desirable to have a sturdy frame structure to support various elements, or from which the elements can be hung, to demonstrate various things such as principles of science. It is also desirable that such frame structure be able to be configured in a variety of shapes and be sturdy in order to support the elements. One desirable feature of such a structure is that it is easy to assemble and to take apart. Another desirable feature would be that its structure will allow various parts of the frame to be part of an electrical circuit.

BRIEF DESCRIPTION OF THE INVENTION

The present invention is a 3-dimensional polyhedron frame structure that is formed of a plurality of rigid rods preferably of an electrically conductive material. The rods are assembled to connecting hubs that preferably are of an electrically insulating material such as plastic. The frame structure is sturdy due to the rigidity of the rods but the rods are easily assembled to the hubs by providing the hubs with threaded sockets and a retractable bolt at the ends of the rods that can be threaded into the sockets when the parts of the frame assembly cannot be moved apart.

Using the rods and hubs of the invention, frames can be formed that are the edges of 3-dimensional polyhedrons of shapes such as prisms and pyramids. As is well known from geometry, a prism is a polyhedron for which the top and bottom faces (known as the bases) are congruent polygons, and all other faces (known as the lateral faces) are rectangles. Technically, when the sides of the prism are rectangles, the shape is known as a right prism, indicating that the lateral faces meet the sides of the base at right angles. But there also are other types of prisms which are described by the shape of the prism base. For example, a rectangular prism has bases that are rectangles, a pentagonal prism has bases that are pentagons and a hexagonal prism has bases that are hexagons. A pyramid is a polyhedron for which the base is a polygon and all lateral faces are triangles.

The rods and hubs of the invention permit sturdy frame structures to be constructed that are simple (one shape such as a right prism) and complex polyhedrons (several shapes such as a right prism with an attached hexagonal prism). There can be other more complicated shapes such as a truncated icosahedron—a "soccer ball" used as an illustration in which 60 carbon atoms (vertices) are joined together by 90 bonds (edges). The foregoing is explained at http://www.learner.org/interactives/geometry/3d.html Novel apparatus for demonstrating scientific principles such as gravity and electromagnetism are made possible by use of the frame structure. In a preferred embodiment of the invention, since the electrically conductive rods are mounted to hubs of non-conductive material, the rods are used as conductive members of an electrical circuit.

BRIEF DESCRIPTION OF THE DRAWINGS

Other objects and advantages of the present invention will become more apparent upon reference to the following specification and annexed drawings in which:

FIG. 6 is a cross-sectional view of a different shaped hub from that shown in FIG. 1;

FIG. 7 is an exploded perspective view of portions of the angle adjusting mechanism of an angle indicator of the gravity demonstration application portion of FIG. 1;

FIG. 8 is a cross-sectional view of a portion of the inclined plane application of FIG. 1 taken along lines 8-8 of FIG. 1.

DETAILED DESCRIPTION OF THE INVENTION

Figure 1:
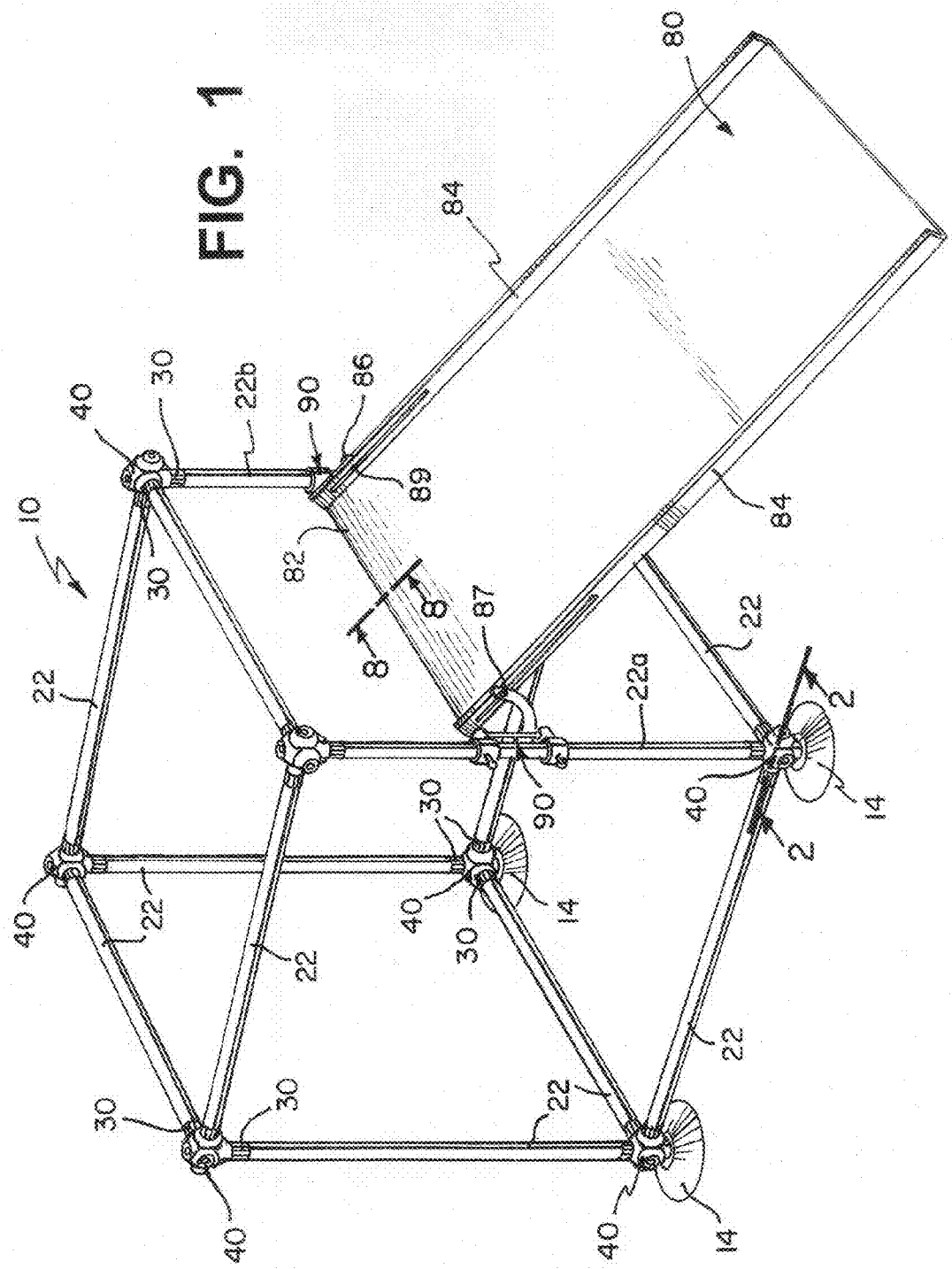
FIG. 1 is a perspective view of typical three dimensional polyhedron frame structure and apparatus for demonstrating effects of gravity.

FIG. 1 is a view of an exemplary frame 10 made in accordance with the invention. In the illustrative embodiment of this figure, the frame is three dimensional and of a right (rectangular) prism shape formed by vertical and horizontal rods 22 connected at each corner of the frame to a hub 40. While the rods are shown as being single pieces of equal length, they can be of two or more parts joined together by a hub to obtain the needed length. At each of the lower four corners of the frame 10, there is a hub 40 to which a pad type member 14 is connected for supporting the frame 10 on a surface such as a table or the floor.

In a preferred embodiment of the invention, the rods 22 are rigid and of an electrically conductive material such as aluminum, steel, etc. Each rod 22 has a retractable coupling member 30 at its end, to be described below, that permits it to be threaded into a socket of the hub 40. In the illustrative embodiment of the invention shown, there is a retractable coupling member 30 at each end of the rod. The rods have the necessary inner and outer diameters and wall thickness and the hubs have the corresponding sizes to address the application for which the frame structure is to be used.

FIGS. 2-5 show the details of the hub 40 and the coupling member 30 for attaching a rod 22 to a hub. The body of the hub 40 is formed of an electrically non-conductive material, such as plastic, so that in an assembled frame the electrically conductive metal rods 22 are electrically insulated from each other. The hub 40, which is molded or machined, has a plurality of generally cylindrical sockets 42 with internal threads 44. The sockets 42 preferably are metal inserts for durability but they also could be formed directly in the plastic hub. In this illustrative embodiment, the hub 40 has four sockets 42 that are spaced 90° apart around the hub body in each of the horizontal and vertical planes so that there is a total of six sockets. As shown below, in other forms of the hub the sockets 42 can be spaced differently so that the frame 10 can have configurations other than the right prism shape shown in FIG. 1.

Figure 2:
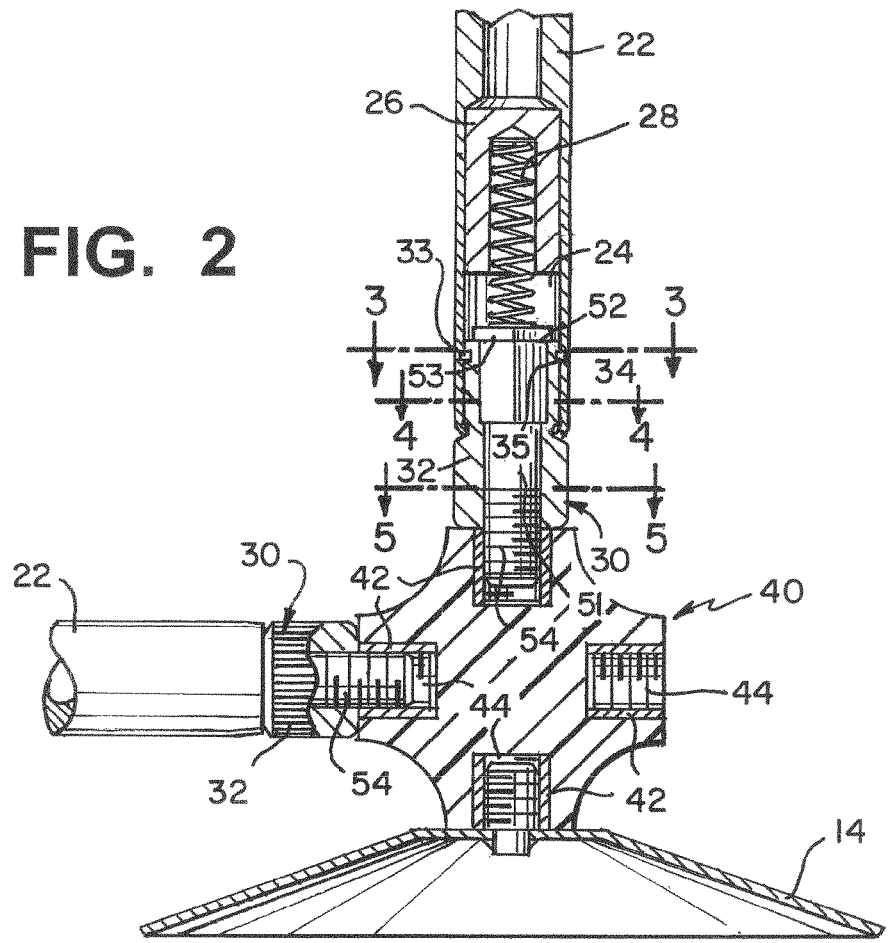
FIG. 2 is a cross-sectional view of a hub of the frame taken along lines 2-2 of FIG. 1.
Figure 3:
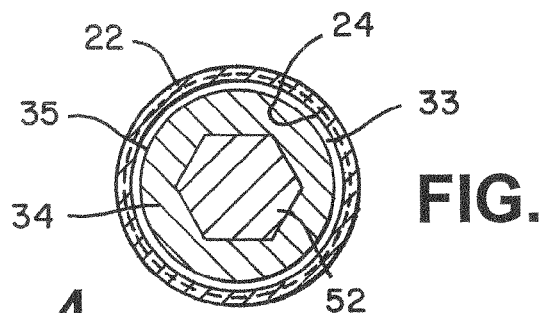
FIG. 3 is the top-cross-sectional view of a part of the hub along lines 3-3 of FIG. 2.
Figure 4:
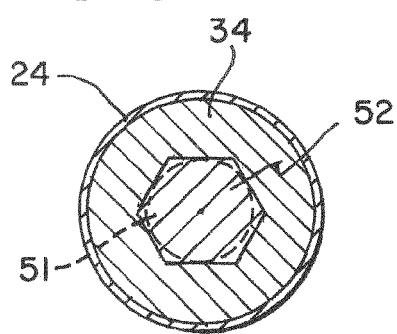
FIG. 4 is a top cross-sectional view of a part of the hub along lines 4-4 of FIG. 2.
Figure 5:
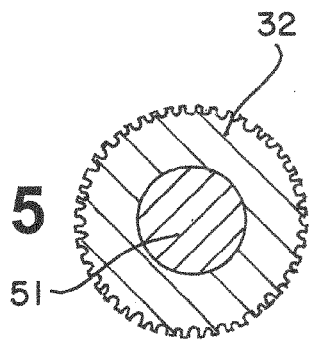
FIG. 5 is a top cross-sectional general view of a part of the hub along lines 5-5 of FIG. 2.

As shown in FIG. 2 an end section 24 of the rod 22 is of an internally greater diameter than the rest of the rod. That is, the wall of the rod end section 24 is thinner than the wall thickness of the remainder of the rod. Within the thinned down rod end section 24 there is a cylindrical cup 26 which holds a coil spring 28. The cup 26 is mounted within the rod end section 24 and has a slightly smaller outer diameter than the rod end inner diameter so that it can be pushed back by the spring to engage the rod 22 where the thinned down section 22 ends. At the open end of the end section 24 there is a rotatable turning knob 32 that can be grasped by the fingers to be rotated. The turning knob has a section 34 inside the rod end 24. The knob internal section 34 has an outer diameter the is less than the rod end 24 inner diameter. A spring type retaining ring 33 is held in a circular groove on the rod end 24 inner wall. The end of the turning knob internal section 34 has a groove 35 into which the retaining ring 33 fits. The entire turning knob is freely rotated on the retaining ring 33 in either direction relative to the rod end as the knob 32 is rotated.

The inner end of the turning rod internal section 34 has a profiled shape, such as hexagonal. A bolt 51 has a profiled inner end 52 of the same shape as the profiled end of the turning knob section 34 that passes through it. The end of the spring 28 extending out of the cup 26 engages a cap 53 on the bolt inner end. The bolt 51 outer end has threads 54 to mate with the socket threads 44. During assembly, the bolt 51 threaded end 54 is passed through the turning knob inner section 34 profiled end and the retaining ring 33 is place in the groove 35 of the turning knob inner section 34. The turning knob inner section 34 end is inserted into the rod end until the retaining ring 33 fixedly fits into the groove on the rod wall inner end. The extreme outer end of the rod section 24 can be crimped into a groove on the turning knob 32 to better secure the turning knob to the rod.

The bolt 51 can move axially against the force of the spring 28 and is rotated as the knob is turned due to the engagement of the mating hexagonal profiles of the turning knob inner section 34 and the bolt end 52. That is, the bolt can move axially as the turning knob is being rotated. Retraction of a bolt by pushing it inwardly permits a rod to be inserted between two hubs of a partially assembled frame which cannot be spread apart because of the rigidity of the rods 22. That is, the effective length of a rod being assembled into the frame can be reduced by axially retracting the bolts 51 at its ends and then threading the bolts into the sockets of the hubs to which they are to be fastened by rotating the turning knob of each bolt. When dis-assembling a rod from a frame, a bolt is pushed back into the rod as it is being un-threaded from its socket. This allows the rod to be removed from the frame.

FIG. 6 shows a modified version of the hub 140. Here, instead of the sockets 42 being spaced 90° apart around the hub body, they are spaced at about 60° apart. This means that there are six sockets 42 around the hub body in each of the horizontal and vertical planes. Thus, a frame in the shape of a hexagonal prism can be assembled using the rods 22. The hubs can have any number of sockets around its body in a plane and there can be sockets in only one plane. A hub having a first number of sockets around its body in one plane can have a different number of sockets in a second plane. Also, the hub planes having the sockets can be at any angle relative to the horizontal and vertical directions and can be at any angle with respect to each other. All of this permits simple and complex three dimensional polyhedron frame structures to be made. The frames will be sturdy because the rods are rigid.

An application of the frame structure of the invention is illustrated by referring back to FIG. 1 as well as FIGS. 7 and 8. Here frame 10 is on a table or on the ground. The upper end of a board or inclined plane 80 is adjustably mounted to two of the vertical rods 22a and 22b in the frame 10 by a support apparatus 90 that is shown in detail in FIG. 7. The support apparatus 90 for each side of the board of upper end has a pair of vertically spaced collars 92a and 92b that have an inner diameter to fit over and slide along a rod 22. The pair of collars 92a and 92b that are vertically spaced apart to ride on one rod 22 are connected together by a rigid vertical shaft 93. As seen in FIG. 8, the pair of collars 92a at the corners of the board upper end are connected together by a rigid horizontal shaft 95 to which a curved upper end 82 of the board 80 is fixedly attached. A thumb screw 94 is threaded through each collar 92 to engage the vertical rod 22 on which the collar rides so that the mounting assembly 90 at the board 80 upper end can be vertically adjusted. A vertical adjustment of the collars 92 along the two vertical rods 22a and 22b causes the angle of inclination of the board 80 to change as its lower end rides on the top of the table or the floor.

An inclinometer is provided on each side of the board 80 to show the angle of board inclination. This is formed by a curved slotted compass piece 86 that is fixedly attached to a respective vertical shaft 93. The compass piece 86 has angle markings. A threaded bolt at the end of an adjusting knob 87 passes through the slot of each compass piece and the slot of an upstanding section 84 on the edge of the board 80. The end of the adjusting knob 87 bolt passes through a washer 88 and is threaded into a nut 89. When the angle of inclination of the board is changed by adjusting the vertical positions of the collars 92 the adjusting knobs 87 are loosened so that the position of the compass pieces 86 can change and properly display the corresponding angle of board 80 inclination.

The adjustable inclination board apparatus 80 of FIG. 1 can effectively be used to demonstrate the principle of gravity to a student. To do this a teacher sets up the frame and apparatus and a ball is placed at the upper end of the inclined board 80 and permitted to roll down. The student sees the place where the ball stops rolling on the table or the floor. Next, the teacher adjusts the angle of the incline of the board 80 and repeats the rolling of the ball. Depending on whether the angle of board inclination has been increased or decreased, the ball will roll a longer or shorter distance from the foot of the board. This teaches the students the concept that objects are attracted to fall down due to the force of gravity. When the board inclination angle is close to zero, the ball moves slowly or does not move at all. When the inclination angle is close to 90° the ball is accelerated by the force of gravity produced by the earth. This activity can be expanded by measuring the time that it takes for the ball to roll down the inclined plane and showing that the smaller the inclination angle, the shorter will be the time duration.

Figure 9:
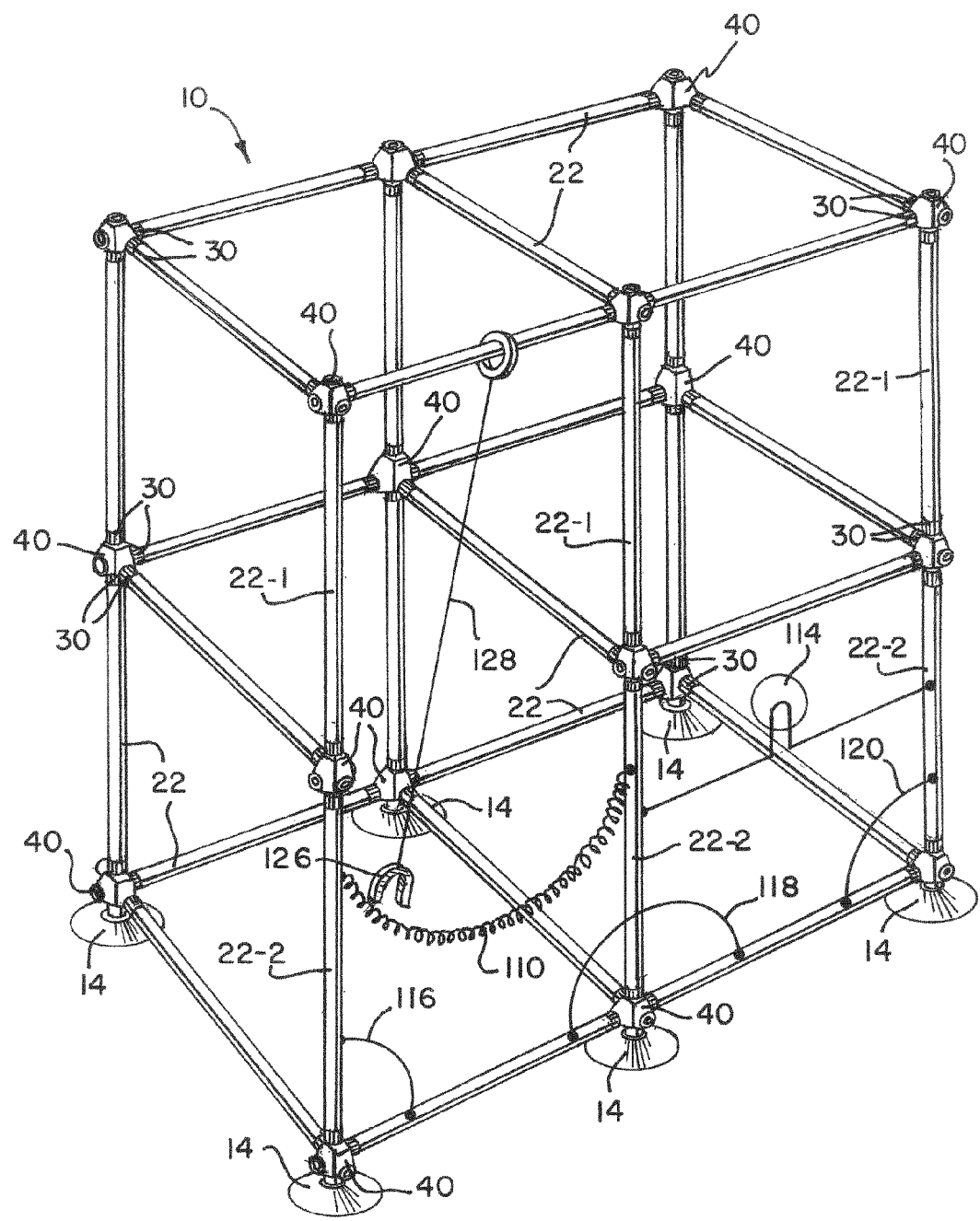
FIG. 9 is a perspective view of a different shaped three dimensional polyhedron frame of the invention and apparatus for demonstrating electromagnetism.

FIG. 9 illustrates using a frame structure for demonstrating the principle of electromagnetism. Here the frame is also of a right prism shape but the rods of one face, illustratively the front face shown, is formed of two rods 22-1 and 22-2 that are joined together by a hub 40. The rods on the other faces of the frame can be of one piece. Since the hubs 40 are of electrically insulating material, the rod pieces 22-1 and 22-2 are electrically insulated from each other.

One end of a coil of wire 110 is electrically connected to the lower rod pieces 22-2 of the left and center vertical rods of the frame front face. The connection can be by spring clips at each end of the wire coil. An incandescent light bulb 114, which can be in a socket (not shown), has its end terminals electrically connected to the lower rod pieces 22-2 of the center and right frame rods, also by suitable clips. Wires 116, 118 and 120 are connected to the various frame rods as shown to form an electrical circuit with the wire coil 110 connected to the light bulb 114. A permanent magnet 126 is suspended by a cord or wire 128 from the top rod of the frame. Assuming that the magnet has sufficient field strength and the wire coil 110 has an adequate number of turns, when the magnet 126 is moved relative to the wire coil 110, the electromagnetic field of the magnet will induce a voltage in the coil 110 and cause the light bulb 114 to produce light. This demonstrates the principle of electromagnetic induction to generate a voltage that can light the light bulb.

The frames of the invention are rigid and sturdy. Therefore, they can support substantial weight. Also, they can be assembled and disassembled so that they can be easily moved. Further various polyhedron shapes for the frames can be formed so that different applications and uses can be accommodated.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

I claim:

1. A 3-dimensional polyhedron frame structure comprising:
    a plurality of hubs having a plurality of sockets that are spaced apart on the exterior of the hub, each said socket having a threaded internal wall;
    a plurality of rigid rods having a threaded bolt mounted on at least one end by a retraction mechanism that permits the bolt to be retracted into the rod as it is being inserted into a said socket of a said hub and to project from the rod as it is being screwed into said socket to form the frame structure, said bolt having a profiled outer diameter only over a portion thereof located entirely within said rod; and
    a turning knob rotatable with respect to said rod and having an inner section only located entirely within the rod and having a profiled channel which matches and engages the profiled outer diameter of said bolt, said turning knob further having an outer section external of the rod that projects radially beyond the inner section and is adapted to be manually grasped and rotated so as to rotate said bolt and cause it to be screwed into said socket.

2. The frame structure as claimed in claim 1
    wherein a said hub has a first plurality of sockets spaced apart around the exterior of the hub in a first plane and a second plurality of sockets spaced around the exterior of the hub in a second plane that is at an angle to said first plane; and
    wherein a said hub is made of an electrically non-conductive material and a said rod is made of an electrically conductive material.

3. The frame structure as claimed in claim 2 wherein said first and second planes are transverse to each other.

4. The frame structure as claimed in claim 3 wherein said first and second planes are respectively horizontal and vertical.

5. The frame structure as claimed in claim 3 wherein each of said first and second plurality of sockets comprise four sockets spaced substantially 90° apart.

6. The frame structure as claimed in claim 3 wherein each of said first and second plurality of sockets comprise six sockets spaced substantially 60° apart.

7. The frame structure as claimed in claim 1 wherein said retraction mechanism at a rod end further comprises:
    a spring mounted within said rod end and engaging said bolt inner end to bias said bolt out of said rod end, whereby said bolt can be retracted into said rod end against the force of said spring and rotated by said turning knob outer section being rotated by the engagement of the turning knob profiled first section end and said bolt profiled inner end.

8. The frame structure as claimed in claim 7 wherein said retraction mechanism at a rod end further comprises a retaining ring fixedly mounted on the inner wall of said rod end and a groove on the outer surface of said turning red knob first section into which said retaining ring fits.

9. The frame structure as claimed in claim 1 wherein a plurality of said rods and said hubs are assembled to form a polyhedron having corners and at least one vertical face formed by a plurality of vertical rods and a plurality of horizontal rods connected to said hubs.

10. The frame structure as claimed in claim 9 further comprising an inclined board having an upper end attached to one of said horizontal rods.

11. The frame structure as claimed in claim 10 wherein said polyhedron frame has at least three said vertical faces formed of rods that are connected together by said hubs to form upper and lower bases, and further comprising a pad mounted to the hub at each corner of the frame lower base to mount said frame on a surface.

12. The frame structure as claimed in claim 10 further comprising an adjusting mechanism attached to the upper end of said board and slidable on two vertical rods of the frame structure to adjust the angle of inclination of said board.

13. The frame structure as claimed in claim 12 further comprising an inclinometer attached to said board to display the angle of inclination of said board.

14. The frame structure as claimed in claim 12 wherein said retraction mechanism at a rod end further comprises:
    a spring mounted within said rod end and engaging said bolt inner end to bias said bolt out of said rod end, whereby said bolt can be retracted into said rod end against the force of said spring and rotated by said turning knob outer section being rotated by the engagement of the turning knob profiled first section end and said bolt profiled inner end.

15. A 3-dimensional polyhedron frame structure comprising:
    a plurality of hubs of an electrically non-conductive material, each said hub having a plurality of sockets that are spaced apart on the exterior of the hub, each said socket having a threaded internal wall;
    a plurality of rigid rods of electrically conductive material, each said rod having a threaded bolt mounted on at least one end by a retraction mechanism that permits the bolt to be retracted into the rod as it is being inserted into a said socket of a said hub and to project from the rod as it is being screwed into said socket to form the frame structure, a plurality of said rods and said hubs being assembled to form a polyhedron having corners and at least one vertical face formed by a plurality of vertical rods and a plurality of horizontal rods connected to said hubs; and
    a coil of wire electrically connected to and between a first two vertical rods of said one face, a light source electrically connected to a second two vertical rods with at least one of which being different from said first two vertical rods, a plurality of electrically conductive wires connected to said rods to connect said coil of wire and said light source, and a magnet mounted to a horizontal rod of said one face to move along a length of said wire coil to induce voltage in said coil as it moves to thereby illuminate said light source.

16. A retraction mechanism for a bolt at an end of a rod comprising:
   a turning knob having a first section mounted to rotate with respect to said rod and being located entirely within the end of a said rod and a second section external of the rod being adapted to be manually grasped and rotated, and which projects radially beyond the first section along its entire extent, said turning knob first section having a profiled inner channel located only entirely within said rod;
   a bolt having a threaded outer end to be threaded into a hub socket and an inner end having an outer profile located only entirely within said rod and corresponding to the profile of the inner channel of said turning knob first section end and extending through the inner channel of said turning knob first section end; and
   a spring mounted within said rod end and engaging said bolt inner end to bias said bolt out of said rod end, whereby said bolt can be retracted into said rod end against the force of said spring and rotated by said turning knob outer section being rotated by the engagement of the turning knob profiled first section end and said bolt profiled inner end.

17. The frame structure as claimed in claim 16 wherein said retraction mechanism at a rod end further comprises a retaining ring fixedly mounted on the inner wall of said rod end and a groove on the outer surface of said turning knob first section into which said retaining ring fits so as to prevent axial movement between the rod end and the turning knob.

* * * * *